United States Patent
Boynton

[15] 3,693,413
[45] Sept. 26, 1972

[54] MOMENT OF INERTIA MEASURING INSTRUMENT

[72] Inventor: Richard Studley Boynton, 81 Hillcrest Terrace, Meriden, Conn. 06450

[22] Filed: Feb. 2, 1971

[21] Appl. No.: 111,979

[52] U.S. Cl. .................................................. 73/65
[51] Int. Cl. .................................................. G01m 1/10
[58] Field of Search ........................... 73/65, 99, 383

[56] References Cited

UNITED STATES PATENTS

| | | | |
|---|---|---|---|
| 3,106,091 | 10/1963 | Korr | 73/65 |
| 3,473,370 | 10/1969 | Mariniak | 73/65 |

*Primary Examiner*—Richard C. Queisser
*Assistant Examiner*—Herbert Goldstein

[57] ABSTRACT

An inverted torsion pendulum which may be used to measure the moment of inertia of physical parts of any size or shape. In one preferred embodiment, a taut wire is placed in tension in a rigid fixed frame. A test object is attached to an object mounting surface located above the fixed frame and concentric with the longitudinal axis of the taut wire. A rigid support structure couples this object mounting surface to the center of the taut wire. Bearings limit the motion of the oscillating assembly to pure rotation. The period of oscillation of the torsion pendulum is determined with a magnetic reed switch and electronic period counter and the moment of inertia of the test object calculated using conventional methods.

5 Claims, 2 Drawing Figures

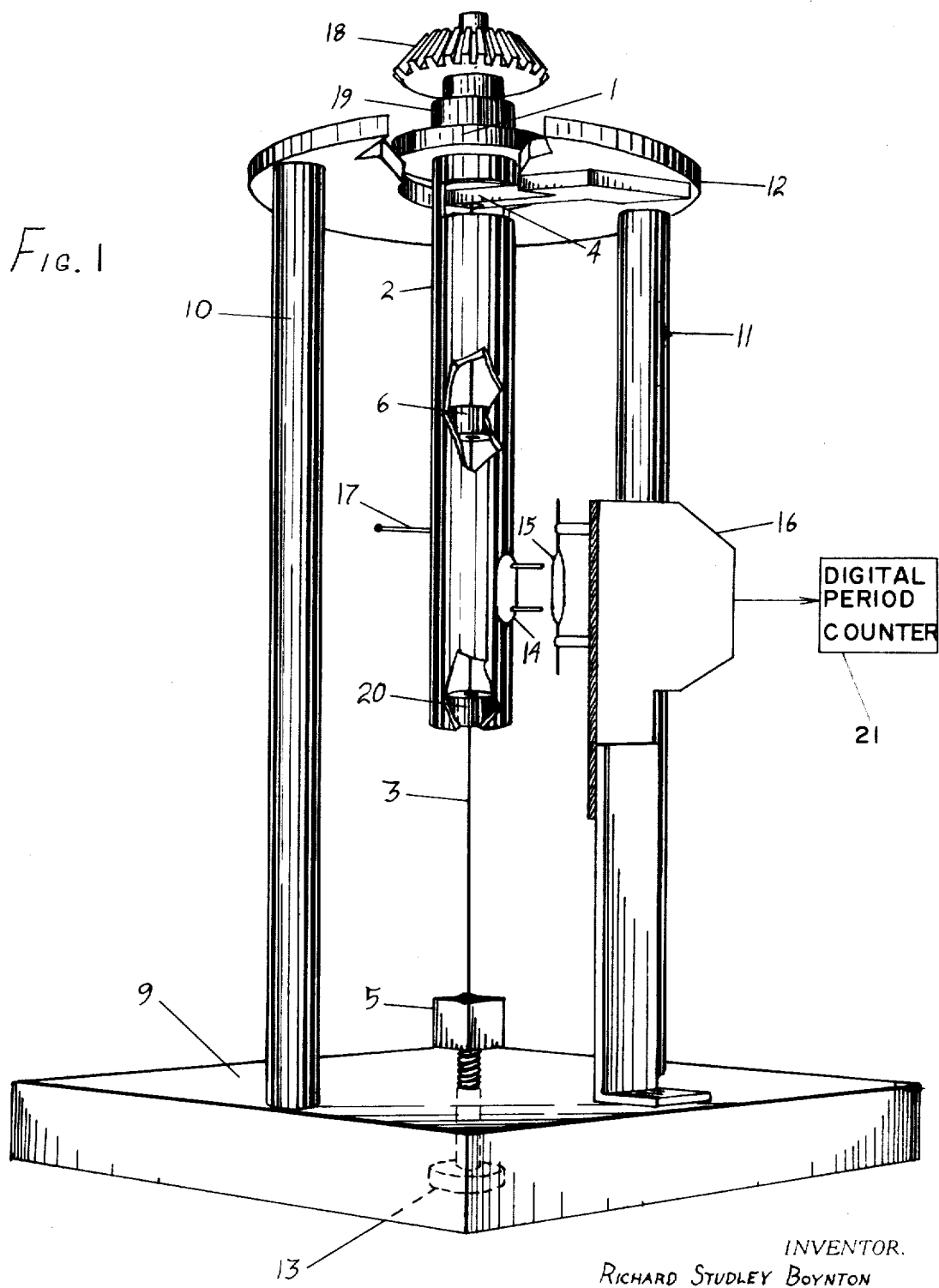

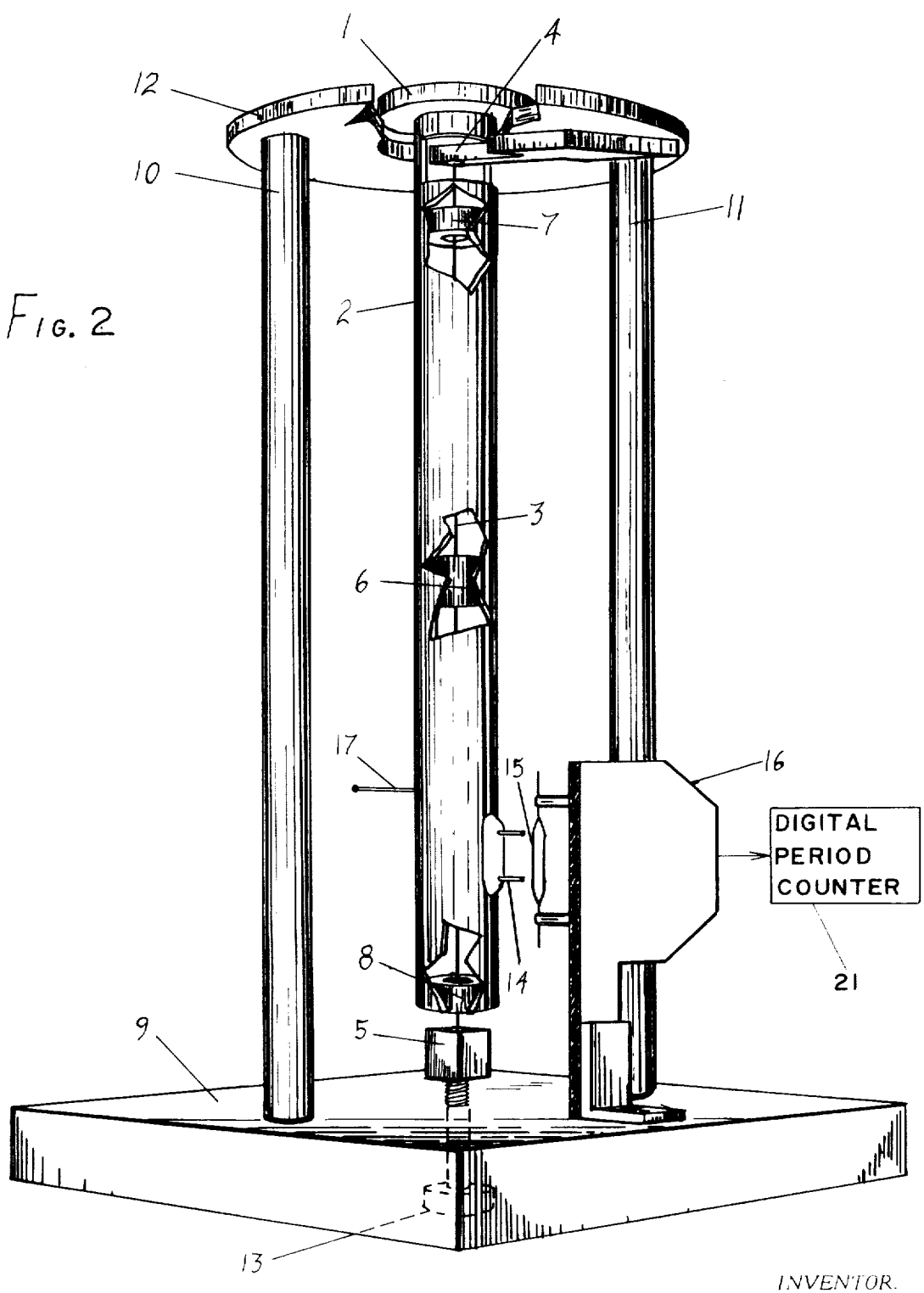

MOMENT OF INERTIA MEASURING INSTRUMENT

This invention generally relates to systems for measuring moment of inertia and more specifically to an inverted torsion pendulum for determining moment of inertia of objects conveniently and accurately.

The proper design of any rotating device requires a knowledge of the moment of inertia of its parts. The moment of inertia of any rotating object is related to the torque required to accelerate the object, to the stress on the driving member during acceleration, to the natural resonant frequency of an object in the torsional mode, and in closed-loop systems to the stability margin of the system. The moment of inertia of objects composed of simple shapes may be calculated by well known methods. However, such calculations are time consuming compared to direct measurement. It is impractical to calculate the moment of inertia of complex shapes or objects made of materials of varying density. Direct measurement of moment of inertia is also desirable in determining variations in production parts where moment of inertia is a critical factor.

The use of a torsion pendulum to measure moment of inertia is well known. However, the classical version of this pendulum was not practical to use nor did it give accurate results. This invention offers a practical and accurate means of implementing the classical concept. The classical torsional pendulum consisted of a wire or thin rod mounted from some type of structure; the test object was hung from the end of this rod. The system had a number of practical disadvantages. First of all, there was the difficulty of hanging the test object upside down from a thin rod. Secondly, there was the expense and space required for the structure which supported the upper end of the rod. Thirdly, the test object would not simply oscillate in a torsional sense—since the object hung freely from a long thin rod, it was also free to oscillate back and forth in any direction, and to bounce up and down. These additional motions made it extremely difficult to measure the rotational period of oscillation and produced errors. And finally, the weight of the test object would stretch the thin rod, changing its torsional spring constant.

Recently, torsion pendulums have been designed using gas bearings. These systems permit the torsion pendulum to be inverted and are very accurate. However, they are relatively expensive and require a source of pressurized nitrogen or clean, dry air.

It is an object of the present invention to provide a torsion pendulum which is inverted but which does not require the use of a gas bearing. Another object of this invention is to restrict the motions of the torsion pendulum other than pure rotation.

Another object of the invention is to provide a torsion pendulum to which standard rotating machine parts such as shafts, gears, and pulleys may be quickly and conveniently mounted.

In one embodiment of the invention, the test object to be measured is rigidly mounted on the object mounting surface on the top of the torsion pendulum; preferably the test object is mounted so that the rotation axis of the instrument passes through the center of gravity of the test object. The torsion pendulum is then twisted slightly and released so that it oscillates about its axis. The period of oscillation of the total moving system is determined by the use of magnetic reed switch which produces electrical timing pulses at a particular angular position of the oscillating system. These electrical timing pulses start and stop an electronic period counter or other accurate timing device. The moment of inertia of the total oscillating system may be calculated by squaring this time period and multiplying it by a calibration constant. This measured moment of inertia is the total of the test object and the instrument itself. The moment of inertia of the instrument and associated mounting hardware is now determined by removing the test object, obtaining a new time period and repeating the basic calculation:

$$I = CT^2$$

This "tare" moment of inertia is then subtracted from the total measured moment of inertia to yield the moment of inertia of the test object.

The value of the calibration constant, C is then measured by mounting a calibration weight of precisely known moment of inertia on the instrument, measuring the time period of oscillation and solving the following equation for C.

$$C = I_c/I_c^2 - I_a^2$$

where
$I_c$ = moment of inertia of calibration weight
$T_c$ = time period with calibration weight mounted
$T_a$ = time period with calibration weight removed The above procedure for measuring moment of inertia using a torsion pendulum is well known.

The invention will be better understood from the following examples which are intended to serve as illustrations but in no way limit the scope of the claims. Reference will be made to the drawings where FIG. 1 illustrates a first embodiment, and shows a test object mounted on the instrument, and FIG. 2 shows a second embodiment of the torsion pendulum.

DETAILS OF THE FIRST EMBODIMENT

Referring to FIG. 1 showing the first embodiment, a test object whose moment of inertia is to be determined (18) is attached to the object mounting surface (1) by means of a test fixture (19) whose inside diameter matches the outside diameter of the shaft on the test object. Test fixtures of various sizes and shapes may be used to attach other size test objects to the object mounting surface, so that any shape or size test object may be tested provided its weight is within the rating of the instrument. The object mounting surface (1) is rigidly fastened to the rigid support structure (2) as are the wire clamps (6) and (20). During the operation of the torsion pendulum these objects remain in a fixed position relative to each other, but as will be described later, this torsion assembly consisting of the items 1, 2, 6, and 20, oscillates relative to the other parts of the instrument. The torsion assembly is fastened to a torsionally resilient member (in this Embodiment A, a taut wire) (3) by means of the clamps (6) and (20). No other part of the torsion assembly comes in contact with the fixed parts of the instrument. The taut wire (3) is supported on one end by clamp (4) which in turn is rigidly fastened to the top plate (12) which is connected to the vertical supports (10) and (11) which are fastened to the base (9). The other end of the taut wire (3) is fastened to clamp (5) which is attached to base (9) through a tension adjusting screw (13). A starting lever (17) is moved in such a direction as to twist the taut wire (3) a small angle such as 5° and is sharply released. This causes the torsion assembly to oscillate in a rotational sense about the longitudinal axis of the taut wire (3). The torsion assembly will continue to oscillate back and forth at a decreasing amplitude as determined by the internal losses in the taut wire (3) and by other losses such as windage. A magnet (14) mounted on the torsion assembly oscillates back and forth relative to a magnetic reed switch (15) which is attached to the base (9) through the circuit board (16). As the magnet (14) moves relative to the magnetic reed switch (15), the magnetic reed switch (15) will open and close in a manner well known to those familiar with magnetic reed switches. The output of the magnetic reed switch (15) is electrically connected to the circuit board (16) which converts the closing of the switch to an electrical signal which lasts for a relatively short period of time (such as 10 microseconds). This narrow timing pulse is introduced to the input of an electronic period counter (21) or other accurate timing device. The first timing pulse starts the counter operating and the second timing pulse stops the counter at exactly one period of oscillation later. The counter therefore reads the mechanical period oscillation of the torsion pendulum. Other methods of measuring time period may be used such as one employing a mirror mounted on the torsion assembly, and a light source and photocell mounted on the fixed part of the instrument.

The moment of inertia of the test object may be determined by taking time period readings with and without the test object as described previously.

DETAILS OF A SECOND EMBODIMENT

FIG. 2 illustrates a second embodiment of the invention (in which the test object and test fixture are not shown for the sake of simplicity). This embodiment differs from that shown in FIG. 1 in the following ways: the second wire clamp (20) has been deleted and the stiffness of the torsion assembly with respect to motions other than oscillation about the longitudinal axis of the taut wire (3) has been increased by the addition of two radially restraining members (bearings) (7) and (8). These bearings are rigidly fastened to the rigid support structure (2). The taut wire (3) passes through the center of these bearings.

OTHER EMBODIMENTS

It should be apparent that the torsionally resilient member which in the first preferred embodiment comprised a single taut wire could be achieved instead by two taut wires mounted on the same axis—one clamped at (5) and (20) and the other clamped at (4) and (6). Or any number of wires with the same or differing cross section could be arranged along the same axis with various fixed structures between them to create the torsionally resilient member without changing the basic function of the torsionally resilient member.

It is also obvious that the taut wire need not be a round wire but can be any cross sectional shape, solid or hollow, provided it is strong enough to support the weight of the test object without significantly changing its torsional stiffness and providing its torsional stiffness is within certain practical limitations determined by factors such as the timing accuracy and the rigidity of the test objects. The term "torsionally resilient member" (Item A in Claim 1) is therefore defined to include all wire means which are flexible in the torsional sense and relatively rigid in the axial direction.

Many other means may be used to decrease the compliance of the oscillating parts to modes other than rotation about the longitudinal axis of the taut wire. For example, bearings may be located outside the space between the wire clamps (4) and (5) at a position which is concentric with the longitudinal axis of the taut wire (3), and some type of rigid structure may be employed to couple these bearings to the rigid support structure (2). Or only one bearing may be used rather than two. Or some type of pivot or crossed web flexure may be used to accomplish the same purpose as the bearings shown in FIG. 2. In fact any mechanical device which limits the motion of the torsion assembly in a direction perpendicular to the longitudinal axis of the taut wire more than it limits rotational motion about the longitudinal axis may be used for this purpose, and no effort will be made to list all such devices.

While the structure of the fixed frame, the rigid support structure, the object mounting surface, and many other parts of the invention have been described and illustrated in detail, it should be apparent to those skilled in the art that certain modifications and variations thereof are possible in light of the above teachings. It is therefore, understood that the present disclosure has been made only by way of example and that numerous changes in the construction and the combination and arrangement of parts may be resorted to without departing from the spirit and the scope of the invention.

I claim as my invention:

1. A torsion pendulum comprising:
   A. A torsionally resilient member
   B. A fixed frame including means for fixedly supporting both ends of A so that A is in tension but free to twist with respect to its torsion axis passing through both supported ends.
   C. An object mounting surface normal to the torsion axis of A and located beyond one end of A.
   D. An attaching means comprising a rigid member extending from C to A and connected to both C and at least one point on A intermediate the ends of A.
   E. A radially restraining means for limiting the motion of C in a direction normal to the torsion axis of A, so that the motion of C is primarily torsional oscillation about the torsion axis of A, said radially restraining means connected to at least one point on D and at least one point on the combination of A and B.
   F. Means for turning C relative to the torsion axis of A and then releasing C causing C to oscillate torsionally relative to the torsion axis of A.
   G. Means of timing the period of said oscillation of C.

2. The combination recited in claim 1 containing in addition at least one more radially restraining means attached to a point on the combination of A and B and attached to D at a point on the torsion axis differing from the location of E, all said restraining means to be concentric with the torsion axis of A.

3. The combination recited in claim 2, wherein said radially restraining members are axial bearings.

4. The combination recited in claim 3, where said object is temporarily fastened to the object mounting surface of C, and where A is a round wire.

5. The combination recited in claim 4, where G comprises a magnet attached to D and a magnetic reed switch attached to B, the output of said reed switch converted to an electrical timing signal which starts and stops a conventional electronic period counter.

* * * * *